United States Patent [19]
Haartsen

[11] Patent Number: 6,108,366
[45] Date of Patent: Aug. 22, 2000

[54] METHOD AND APPARATUS FOR THE GENERATION OF FREQUENCY HOPPING SEQUENCES

[75] Inventor: Jacobus Cornelis Haartsen, Borne, Netherlands

[73] Assignee: Telefonaktiebolaget LM Ericsson, Stockholm, Sweden

[21] Appl. No.: 08/950,068

[22] Filed: Oct. 14, 1997

[51] Int. Cl.[7] ............ H04B 15/00; H04K 1/00; H04L 27/30
[52] U.S. Cl. ............ 375/134; 708/250
[58] Field of Search ............ 375/202, 134; 708/250, 252

[56] References Cited

U.S. PATENT DOCUMENTS 4,066,964  1/1978   Costanza et al. .
4,276,652  6/1981   McCalmont et al. ............ 380/34
4,383,323  5/1983   Timor ............ 375/202
4,876,659  10/1989  Devereux et al. .

FOREIGN PATENT DOCUMENTS 0 247 790  12/1987  European Pat. Off. .

OTHER PUBLICATIONS

"Spread Spectrum Communications Handbook," Simon et al., McGraw–Hill, Inc., 1994, Chapter 5, pp. 262–396.

Primary Examiner—Don N. Vo
Assistant Examiner—Phuong Phu
Attorney, Agent, or Firm—Burns, Doane, Swecker & Mathis, L.L.P.

[57] ABSTRACT

A frequency hopping generator comprises an XOR processing module and a PERM (permutation) processing module arranged in series. The XOR and PERM modules act directly on input clock lines as a function of a selection address. The hopping number sequence generated by the frequency hopping generator can be changed in real-time by changing the selection addresses, while the phase of the sequence can be changed in real-time by changing the clock value on the clock lines. The frequency generator finds exemplary use in rapidly switching between different piconets in a wireless scatter network.

30 Claims, 8 Drawing Sheets

| CLOCK $c_2 c_1 c_0$ | OUTPUT | | | | | | | |
|---|---|---|---|---|---|---|---|---|
| | R $e_2 e_1 e_0$ =000 | A $e_2 e_1 e_0$ =001 | B $e_2 e_1 e_0$ =010 | C $e_2 e_1 e_0$ =011 | D $e_2 e_1 e_0$ =100 | E $e_2 e_1 e_0$ =101 | F $e_2 e_1 e_0$ =110 | G $e_2 e_1 e_0$ =111 |
| 000 | 000 (0) | 001 (1) | 010 (2) | 011 (3) | 100 (4) | 101 (5) | 110 (6) | 111 (7) |
| 001 | 001 (1) | 000 (0) | 011 (3) | 010 (2) | 101 (5) | 100 (4) | 111 (7) | 110 (6) |
| 010 | 010 (2) | 011 (3) | 000 (0) | 001 (1) | 110 (6) | 111 (7) | 100 (4) | 101 (5) |
| 011 | 011 (3) | 010 (2) | 001 (1) | 000 (0) | 111 (7) | 110 (6) | 101 (5) | 100 (4) |
| 100 | 100 (4) | 101 (5) | 110 (6) | 111 (7) | 000 (0) | 001 (1) | 010 (2) | 011 (3) |
| 101 | 101 (5) | 100 (4) | 111 (7) | 110 (6) | 001 (1) | 000 (0) | 011 (3) | 010 (2) |
| 110 | 110 (6) | 111 (7) | 100 (4) | 101 (5) | 010 (2) | 011 (3) | 000 (0) | 001 (1) |
| 111 | 111 (7) | 110 (6) | 101 (5) | 100 (4) | 011 (3) | 010 (2) | 001 (1) | 000 (0) |

| CLOCK $c_2 c_1 c_0$ | OUTPUT | | | | | | | |
|---|---|---|---|---|---|---|---|---|
| | R $p_2 p_1 p_0$ =000 | A $p_2 p_1 p_0$ =001 | B $p_2 p_1 p_0$ =010 | C $p_2 p_1 p_0$ =011 | D $p_2 p_1 p_0$ =100 | E $p_2 p_1 p_0$ =101 | F $p_2 p_1 p_0$ =110 | G $p_2 p_1 p_0$ =111 |
| 000 | 000 (0) | 000 (0) | 000 (0) | 000 (0) | 000 (0) | 000 (0) | 000 (0) | 000 (0) |
| 001 | 001 (1) | 100 (4) | 001 (1) | 100 (4) | 010 (2) | 010 (2) | 100 (4) | 001 (1) |
| 010 | 010 (2) | 010 (2) | 100 (4) | 001 (1) | 001 (1) | 100 (4) | 001 (1) | 100 (4) |
| 011 | 011 (3) | 110 (6) | 101 (5) | 101 (5) | 011 (3) | 110 (6) | 101 (5) | 101 (5) |
| 100 | 100 (4) | 001 (1) | 010 (2) | 010 (2) | 100 (4) | 001 (1) | 010 (2) | 010 (2) |
| 101 | 101 (5) | 101 (5) | 011 (3) | 110 (6) | 110 (6) | 011 (3) | 110 (6) | 011 (3) |
| 110 | 110 (6) | 011 (3) | 110 (6) | 011 (3) | 101 (5) | 101 (5) | 011 (3) | 110 (6) |
| 111 | 111 (7) | 111 (7) | 111 (7) | 111 (7) | 111 (7) | 111 (7) | 111 (7) | 111 (7) |

METHOD AND APPARATUS FOR THE GENERATION OF FREQUENCY HOPPING SEQUENCES

CROSS REFERENCE TO RELATED APPLICATIONS

This application is related to commonly assigned U.S. application Ser. No. 08/932,911 [our reference 027556-380/BT 11161] entitled "Frequency Hopping Piconets in an Uncoordinated Wireless Multi-User System", and to commonly assigned U.S. application Ser. No. 08/932,244 [our reference 027556-381/BT 11266] entitled "Contemporaneous Connectivity to Multiple Piconets", both filed on Sep. 17, 1997. Both of these applications are hereby incorporated by reference herein.

BACKGROUND

The invention relates to a technique for generating a pseudo-randomly ordered sequence of integers. In particular, the invention relates to a method and apparatus for generating sequences for an uncoordinated frequency hopping wireless communication system.

In the last decade, progress in radio and VLSI technology has fostered widespread use of radio communications in consumer applications. Portable devices, such as mobile radios, can now be produced having acceptable cost, size and power consumption.

Although wireless technology is today focused mainly on voice communications (e.g., with respect to hand-held radios), this field will likely expand in the near future to provide greater information flow to and from other types of nomadic devices and fixed devices. More specifically, it is likely that further advances in technology will provide very inexpensive radio equipment which can be easily integrated into many devices. This will reduce the number of cables currently used. For instance, radio communication can eliminate or reduce the number of cables used to connect master devices with their respective peripherals.

The aforementioned radio communications will require an unlicensed band with sufficient capacity to allow for high data rate transmissions. A suitable band is the ISM (Industrial, Scientific and Medical) band at 2.4 GHz, which is globally available. This band provides 83.5 MHz of radio spectrum.

To allow different radio networks to share the same radio medium without coordination, signal spreading is usually applied. In fact, the FCC in the United States currently requires radio equipment operating in the 2.4 GHz band to apply some form of spreading when the transmit power exceeds about 0 dBm. Spreading can either be at the symbol level by applying direct-sequence spread spectrum or at the channel level by applying frequency hopping (FH) spread spectrum. The latter is attractive for the radio applications mentioned above since it more readily allows the use of cost-effective radios.

In frequency hopping systems, optimal interference immunity is obtained by hopping over the entire 83.5 MHz band on average. At the same time, implementation is facilitated by using a narrow channel, for example, 1 MHz.

Most of the time, different FH radios use different hop frequencies, but occasionally the units may collide if they happen to select the same hop frequency. In order to reduce the probability of this occurrence, each link should preferably have its own FH sequence, since the deployment of two links with the same FH sequence would result in constant collisions if the sequences are in phase. Also, the units should use FH sequences that show low cross-correlation. It is therefore desirable to derive as many different FH sequences as possible which show low cross-correlation. In the optimal case, the FH sequences should be orthogonal. However, this requires the synchronization of different radio units which is both impractical and currently not permitted by the FCC in the United States.

In the above-referenced patent application entitled "Frequency Hopping Piconets in an Uncoordinated Wireless Multi-User System" by the present inventor, a system is disclosed for forming a wireless scatter network of multiple uncoordinated "piconets". As shown in FIG. 1, a network 10 comprises three piconets (A, B and C), each of which communicates with a subset of the wireless units 100, 102, 104, 106 and 108. In the scatter network, piconets are dynamically formed and abandoned to suit the communication requirements of wireless units within the network. For instance, piconet C is established to carry out the exchange of information between units 104 and 106.

All piconets make use of the same radio medium. This radio medium is divided into a large number of subchannels, each centered around a certain carrier frequency. All units in the same piconet synchronously hop from one channel to the next channel. Because different piconets use different pseudo-random hopping sequences, interference immunity is obtained by frequency hopping through a sequence of channels selected in, for example, the 2.4 GHz band. Further details regarding the communication of information using the frequency hopping technique can be found in commonly assigned U.S. patent application Ser. No. 08/685,069, entitled "Short-Range Radio Communications System and Method of Use", which was filed on Jul. 23, 1996, and which is incorporated herein in its entirety by reference.

In each piconet, one of the wireless units is designated as a master and the remaining units are slaves. The frequency hopping sequence for each piconet is generated at the master unit on the basis of the master unit's address. The phase within the selected hopping sequence is a function of the master's free-running clock. Once a connection has been established between a master and a slave, the master unit conveys its master address and master clock to the slave unit. The master address and master clock are then used to define the virtual frequency hopping channel that will be used in communications between the master unit and all of the slave units associated with the master unit in the piconet.

To generate the necessary hop frequencies, each unit 100 ... 108 includes a frequency hop generator 112 ... 120, respectively. An exemplary frequency hop (FH) generator is shown in FIG. 2. The FH generator 200 shown there receives a clock "CLK" input (representative of the master's clock) and an address input (representative of the master's address), and generates a hop number therefrom. Changing the clock generates a different hop number within the sequence. In other words, changing the clock selects a different phase within the sequence.

In the second above-referenced patent application entitled "Contemporaneous Connectivity to Multiple Piconets" by the present inventor, a technique is described for providing connectivity between different piconets. In this disclosure, a unit can switch from one piconet to another by changing the address and the clock. For example, as shown in FIG. 1, for piconet A, master address_A and clock_A are used, whereas for piconet B, master address_B and clock_B are used. Unit 108 participating as a slave in piconet_A will apply address_A and clock_A to follow the FH channel in piconet A. If this unit wants to participate in piconet_B as a slave, it simply changes to address_B and clock_B. Alternatively, unit 108 can be participating in piconet A as a master, yet switches to piconet B to participate as a slave. These switches preferably occur in real-time so that the unit can jump from one piconet to another piconet, such that it virtually participates in all piconets simultaneously.

In systems such as described above, it is desirable to quickly switch from one sequence to another. Conventional systems do not readily satisfy this objective. For instance, if the sequence is of sizeable format, the sequence can be generated off-line using some pseudo-random generator process, and then downloaded into RAM memory. The RAM is subsequently read out using the clock to address the RAM. However, off-line processing and downloading into RAM imposes considerable time and power requirements. In addition, the sequence length is restricted by the limited size (capacity) of the RAM. Also, since the contents of the RAM represent the frequency hopping sequence, fast switching between piconets that use different sequences is not possible because the RAM contents can not be changed quickly.

Another method for generating sequences is through the use of linear or non-linear feedback registers. These registers are used as number generators in encryption routines and general cryptographic procedures. By clocking the registers, a cycle is followed whose sequence and length depends on the feedback connections. Different cycles can be chosen by changing the feedback connections. A problem with these registers is that the number of sequences with suitable properties is limited. Some settings (corresponding to respective addresses) will produce very short sequences with inadequate properties, while other settings will produce very long sequences.

In addition, the application shown in FIG. 1 requires a direct mapping of the clock value CLK onto a hop number. This mandates that the FH generator not have a memory, since this would be unsatisfactory when jumping from one piconet to another piconet. For a feedback register, this means that the register has to be initialized with the clock value after which the feedback register is clocked one or several times after which the hop number is read out. For the next and subsequent clock values, this procedure has to be repeated.

Still other techniques for generating pseudo-random sequences are discussed in "Spread Spectrum Communications Handbook", Simon et al., McGraw-Hill, Inc., copyright 1994, chapter 5. These techniques are also generally unsuited for the real-time requirements imposed by the application discussed above.

SUMMARY

It is therefore one exemplary objective of the present invention to provide a method and an apparatus for directly and in real-time generating a hop number from an input address setting and clock value.

According to one exemplary aspect of the present invention, this objective is achieved using a frequency hopping generator for use in a wireless communication network comprising a permutation (PERM) processing module for processing a portion of a clock signal as a function of the address signal, and an exclusive OR (XOR) processing module, arranged in series with the PERM module, for processing the portion of the clock signal as a function of the address signal. To facilitate discussion, the selection addresses supplied to the PERM module are referred to as PERM address signals (represented by the symbol "p"), while the selection addresses supplied to the XOR module are referred to as XOR address signals (represented by the symbol "e"). The output of the serially arranged PERM and XOR modules defines one of a plurality of Z hop numbers. Changes in the address produce a substantially instantaneous change in an output sequence of the hop numbers. Changes in the clock signal produce a substantially instantaneous change in a phase of an output sequence of the hop numbers.

According to another exemplary aspect of the invention, the addresses supplied to the PERM and XOR modules are the result of additional XOR and/or PERM processing. This additional XOR and PERM processing increases the number of unique sequences and can also increase the length of each sequence.

According to another exemplary aspect of the invention, a modulo M adder is provided which receives the one out of Z frequency hop numbers and generates one out of M frequency hop numbers.

According to another exemplary aspect of the invention, a memory, such as a ROM, is provided which stores a plurality of hop frequencies corresponding to a plurality of output hop numbers. The hop frequencies are arranged to ensure an adequate spectral separation between adjacent hop frequencies in a sequence.

According to still another exemplary aspect of the invention, a method for use in a frequency hopping wireless network is provided, comprising the steps of: receiving a portion of a clock signal comprising rows and columns of clock information bits; performing permutation processing on the portion of the clock signal to vary bit values in a column direction of the information bits as a function of a permutation address; performing exclusive OR processing on the portion of the clock signal to vary bit values in a row direction of the information bits as a function of a exclusive OR address; and generating one of Z output frequency hop numbers on the basis of the permutation processing and the exclusive OR processing.

BRIEF DESCRIPTION OF THE DRAWINGS

The objects and advantages of the invention will be understood by reading the following detailed description in conjunction with the drawings in which:

FIG. 3(*b*) shows the output generated by the XOR module in FIG. 3(*a*) for different clock values and address settings;

FIG. 4(*b*) shows the manipulations performed by the PERM processing module on the input clock lines;

FIG. 4(*c*) shows exemplary means for implementing the manipulations shown in FIG. 4(*b*);

FIG. 4(*d*) shows the output generated by the PERM module in FIG. 4(*a*) for different clock values and address settings;

DETAILED DESCRIPTION

Figure 1:
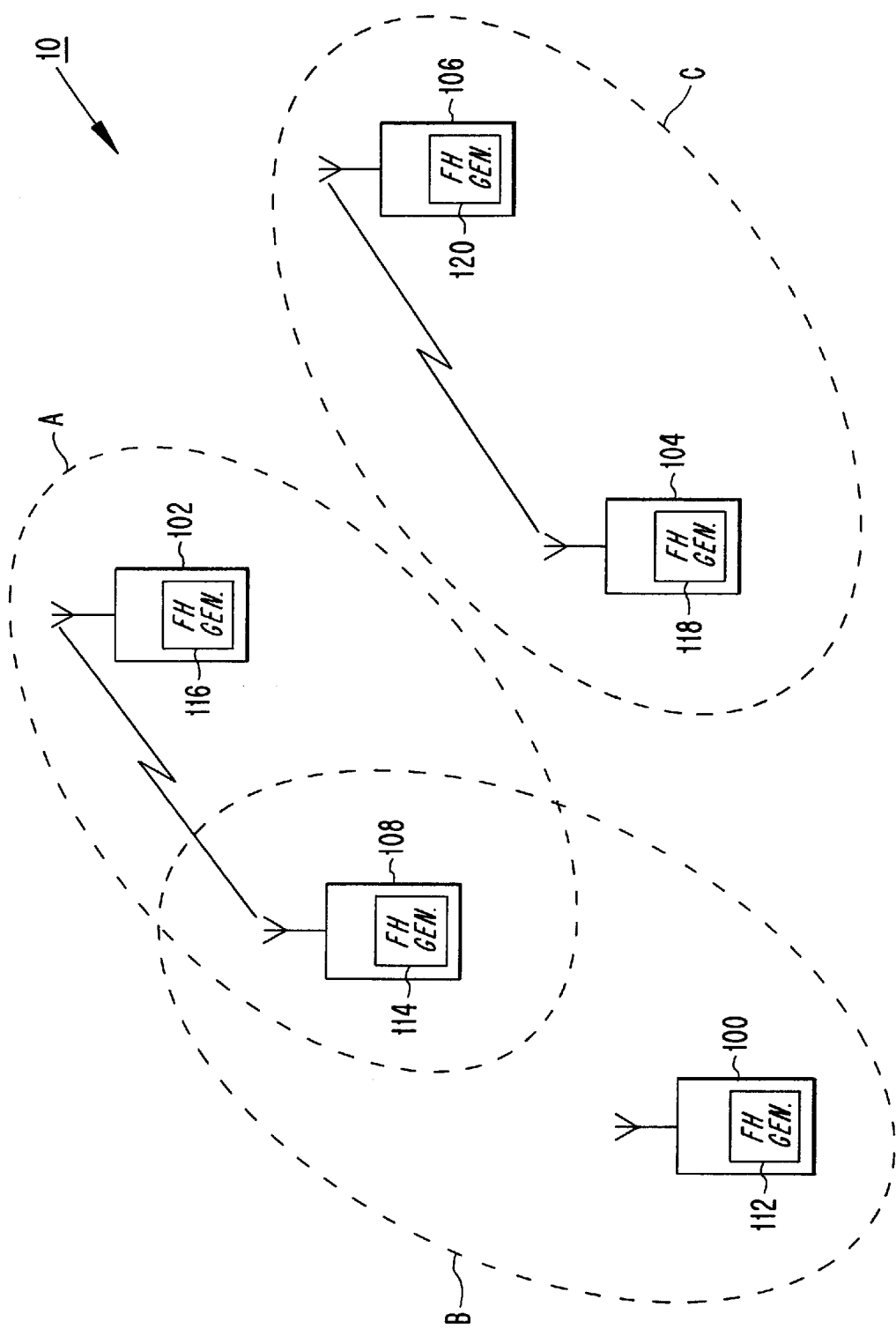
FIG. 1 is an exemplary overview of a network in which wireless units communicate using multiple piconets.

The various features of the invention will now be described with respect to the figures, in which like parts are identified with the same reference characters.

By way of overview, the method and means disclosed herein directly selects a FH sequence on the basis of an input address and directly selects the phase in the sequence on the basis of a clock value. Changing the address quickly provides the proper hop channel corresponding to a new FH sequence. Changing the clock (e.g., by incrementing, decrementing, or performing an arbitrary jump in clock values) quickly provides the proper hop channel corresponding to the new phase.

Figures 3A, 3B:
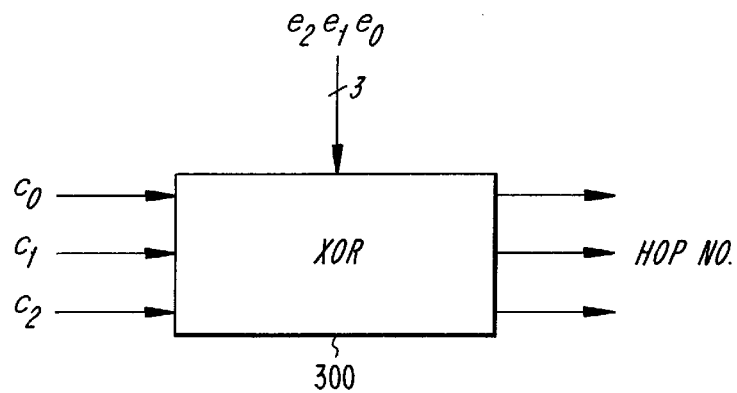
FIG. 3(*a*) shows an exemplary implementation of the frequency hopping generator of FIG. 2 using an XOR module.
Figure 4A:
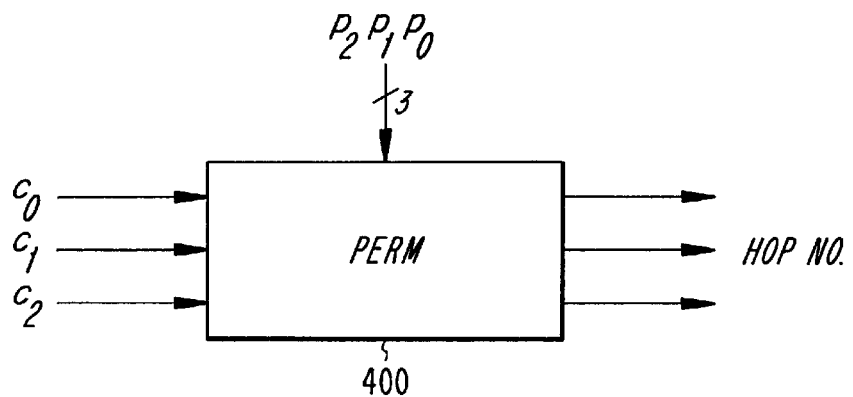
FIG. 4(*a*) is an exemplary implementation of the frequency hopping generator of FIG. 2 using a PERM processing module.
Figure 5:
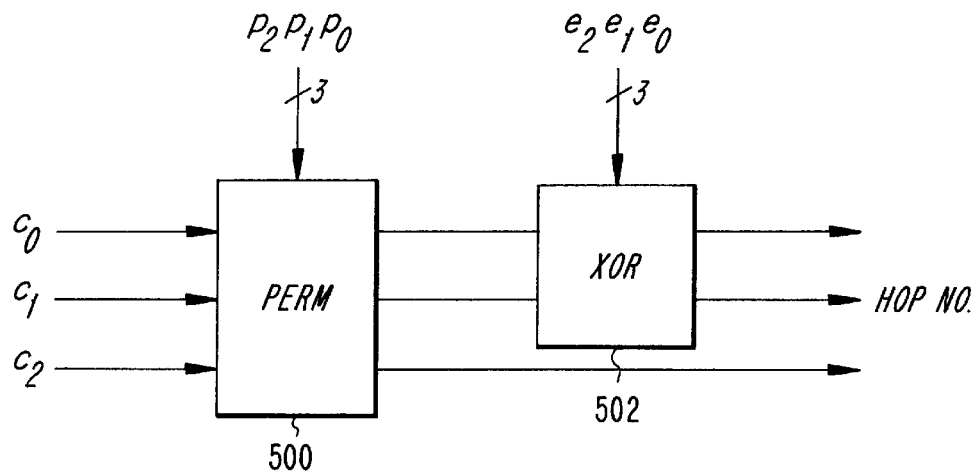
FIG. 5 is an exemplary implementation of the frequency hopping generator of FIG. 2 using an XOR module and a PERM processing module in combination.

According to one embodiment, the functions described above are implemented by performing XOR (exclusive OR) processing and/or PERM (permutation) processing on the output of the free-running clock of the master, as a function of an input address. By way of overview, FIG. 3(a) shows the use of an XOR module to generate frequency hop numbers and FIG. 4(a) shows the use of a PERM module to generate the frequency hop numbers. FIGS. 5–8 show embodiments having a combination of one or more XOR modules and PERM modules. For instance, as shown in FIG. 5, the LSB values $c_2 c_1 c_0$ of the clock are fed to a PERM processing module 500, the output of which is fed into an XOR module 502. The output of the XOR module 502 defines a hop number within a hopping sequence which is a function of the selection inputs applied to the PERM module 500 and the XOR module 502, respectively.

In all illustrated embodiments, selection inputs are representative of the address signal supplied to the frequency hopping generator, and in the specific application discussed above, are representative of the master address in a piconet. To facilitate discussion, the selection address supplied to the PERM module is referred to as a PERM address or a PERM address signal (represented by the symbol "p"), while the selection address supplied to the XOR module is referred to as an XOR address or an XOR address signal (represented by the symbol "e"). For instance, in FIG. 5, the 3-bit input supplied to the PERM module is represented by $p_2 p_1 p_0$ while the 3-bit input supplied to the XOR module is represented by $e_2 e_1 e_0$. However, it should be kept in mind that these signals are ultimately representative of the address bits supplied to the frequency hopping generator, or some subset thereof (or more generally, some derivative thereof). The p and e signals may comprise different portions of the input address signal. For instance, in one exemplary embodiment, the $p_2 p_1 p_0$ and the $e_2 e_1 e_0$ selection addresses can comprise the lower order six address bits of an input address signal $a_5 a_4 a_3 a_2 a_1 a_0$ (e.g., in one exemplary embodiment, $p_2 p_1 p_0 = a_5 a_4 a_3$ and $e_2 e_1 e_0 = a_2 a_1 a_0$ or $p_2 p_1 p_0 = a_2 a_1 a_0$ and $e_2 e_1 e_0 = a_5 a_4 a_3$). Alternatively, the p and e signals may "overlap" (i.e., portions of the p and e signals may define the same master address bits). Also, the p and e addresses need not define consecutive address bits of the address supplied to the frequency generator. As used herein, the p and e addresses are simply labels which denote those signals which are applied to the PERM and XOR modules, respectively.

The characteristics of the circuits shown in the various embodiments will be now be described in greater detail by first separately examining the properties of the XOR module and the PERM processing module, with reference to FIGS. 3 and 4 below.

FIG. 3(a) shows an exemplary XOR module 300 which receives a 3-bit clock and generates FH sequences of length 8 based on a 3-bit input address $e_2 e_1 e_0$. Generally, the XOR operation inverts a clock bit when a respective address bit has value of "1", whereas the clock bit is unchanged when the address bit has a value of "0". The XOR module applies the XOR operation to each bit i of the clock signal, such that each bit i of the output "h" is defined by $h_i = c_i \oplus e_i$ (i.e., $h_2 = c_2 \oplus e_2$, $h_1 = c_1 \oplus e_1$, and $h_0 = c_0 \oplus e_0$). Since there are three address bits in the XOR operations, the XOR operation provides 8 different FH sequences each of length 8.

FIG. 3(b) shows the different sequences generated by the XOR module 300. That is, each column (denoted by letters R, A, B, C . . . G) represents a different sequence corresponding to a different input address $e_2 e_1 e_0$. The output hop numbers are listed in their binary form as output bits $h_2 h_1 h_0$, and in their decimal representations as a numeral enclosed in parentheses. The different numbers within each sequence correspond to different phases within the sequence. A specific phase is selected on the basis of the input clock value. The reader will note that the XOR operation exchanges the rows in two-by-two fashion.

The XOR operation on the MSB of the clock ($c_2 = 1$) merely rotates the FH sequence by half its length. Since the above-described exemplary piconet application will not allow synchronization, this means that a FH sequence and a shifted version are one and the same sequence. So sequences R and D are the same, as are sequences A and E, B and F, and C and G. The XOR operation on the MSB of the clock can therefore be discarded. The total number of different hop sequences of length 8 derived with the XOR operation is therefore 4. Generally, for an N input clock line, the XOR operation will produce $2^{(N-1)}$ distinct sequences.

Figure 2:
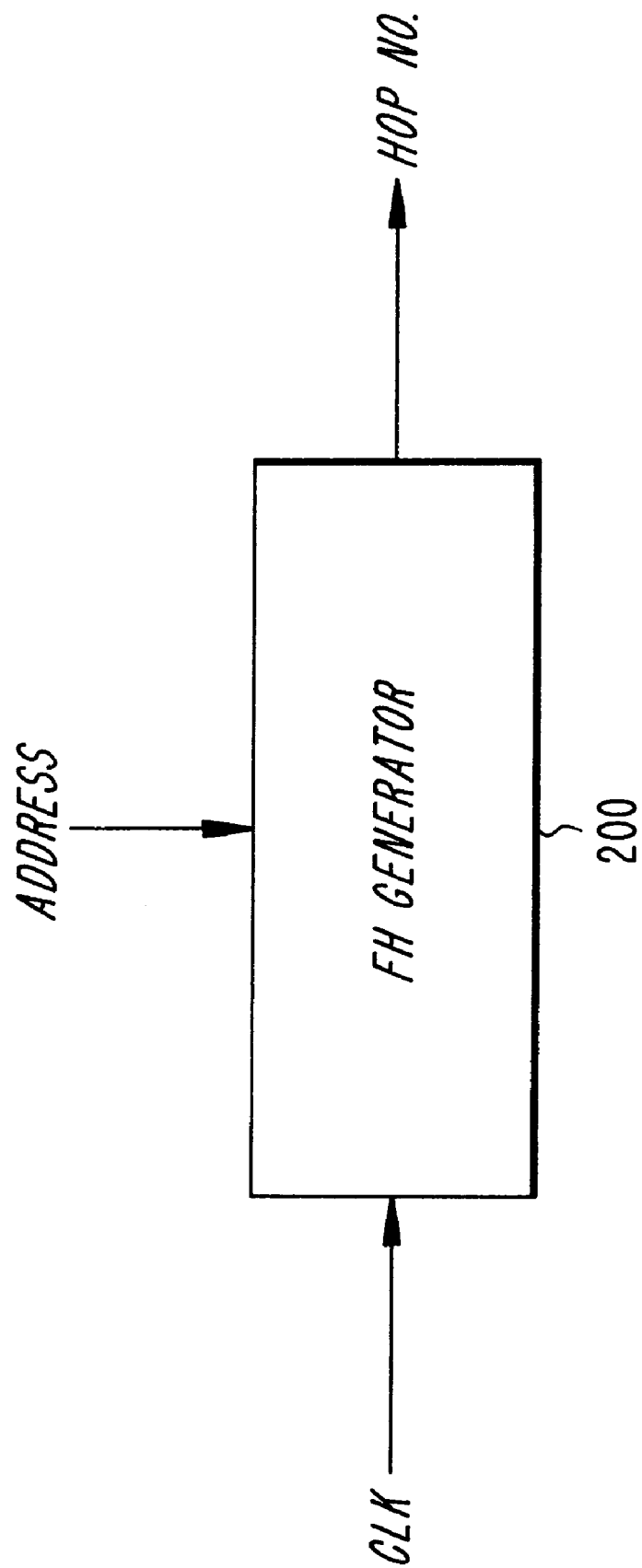
FIG. 2 is an overview of a frequency hopping generator having a master address and a master clock for input and a hop number for output.

It will be understood that the configuration shown in FIG. 3(a) fulfills the requirements of the blackbox in FIG. 2 since changing the address $e_2 e_1 e_0$ directly changes the sequence, and changing the clock $c_2 c_1 c_0$ directly changes the phase in this sequence.

The second operation, the permutation operation, is generally depicted in FIG. 4(a). As shown there, the PERM processing module 400 receives the LSB bit values $c_2 c_1 c_0$ of the clock and selection inputs $p_2 p_1 p_0$ and generates an output hop number therefrom (which can be represented as output bits $h_2 h_1 h_0$). Generally, the PERM operation applies a one-to-one mapping from the input clock signals to the output hop number based on the selection inputs. That is, input $c_0$ can be connected to any of the outputs $h_0$, $h_1$, $h_2$. If the $c_0$ line is selected, the $c_1$ bit can be connected to N−1 remaining outputs. Then, the $c_2$ bit can be connected to any of the N−2 remaining outputs, etc. In total, N!=Nx(N−1)x(N−2)x . . . x2x1 different combinations are possible. With N=3, for instance, there are 3!=6 different permutations. The selection address $p_2 p_1 p_0$ therefore needs 3 bits in this case.

Figure 4B:
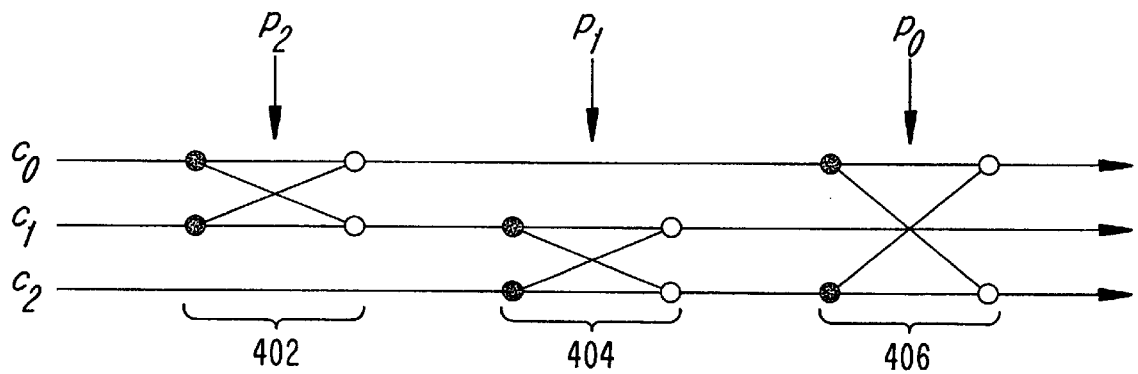

FIG. 4(b) shows a series of butterfly configurations to implement the function shown in FIG. 4(a). For N=3, at each stage, one butterfly exchanges two lines. The selection bits $p_2 p_1 p_0$ determine whether the butterfly lets the signals passed unchanged, or whether an exchange (switch) is applied. For instance, when the address bit $p_2$ has a value of "1", then selected clock lines at a first stage are effectively switched using logic 402. When the address bit $p_1$ has a value of "1", then selected clock lines at a second stage are effectively switched using logic 404. When the address bit $p_0$ has a value of "1", then selected clock lines at a third stage are effectively switched using logic 406.

Figures 4C, 4D:
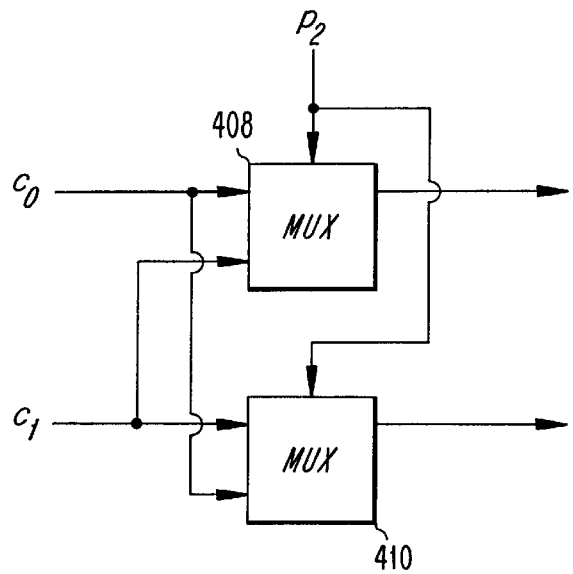

Each butterfly can be implemented with two 2-input multiplexers. For instance, FIG. 4(c) shows a pair of 2-input multiplexers for implementing the logic 402 shown in FIG. 4(b). In FIG. 4(c), when the value of the selection bit $p_2$ is "1", then multiplexer 408 will output the value of $c_1$ and multiplexer 410 will output the value of $c_0$. When the value of the selection bit $p_2$ is "0", then multiplexer 408 will output the value of $c_0$ and multiplexer 410 will output the value of $c_1$.

Finally, FIG. 4(d) shows the input-output relationship for the PERM operation in FIGS. 4(a)–4(c). A total of 8 different sequences are generated (labeled R, A, B, . . . G). However, sequence F is the same as sequence C, and sequence G is the same as sequence B. Therefore, the PERM operation generates six unique sequences. Generally, the PERM operation produces N! distinct sequences, where N represents the number of input clock values. The reader will note that the PERM operation exchanges the columns of the clock sequence, whereas the XOR operation exchanges the rows of the clock sequence.

The output entries in FIG. 4(d) are derived using the exemplary switching operations shown in FIG. 4(b). For instance, the selection input $p_2p_1p_0$=100 will generate an output $h_2h_1h_0$ of 001 for an input clock value of $c_2c_1c_0$=010, since the logic 402 in FIG. 4(b) effectively switches the input lines for $c_1$ and $c_0$. The selection input $p_2p_1p_0$=101 will generate an output $h_2h_1h_0$ of 100 for an input clock value of $c_2c_1c_0$=010, since the logic 402 in FIG. 4(b) effectively switches the input lines for $c_1$ and $c_0$ to produce an intermediary output of 001 and the logic 406 switches the input lines for $c_2$ and $c_0$ to produce the final output of 100.

Again, note that the configuration shown in FIG. 4(a) fulfills the requirements of the blackbox in FIG. 2 since changing the selection bits $p_2p_1p_0$ directly changes the sequence, and changing the clock $c_2c_1c_0$ directly changes the phase in this sequence.

The XOR and PERM modules shown in FIGS. 3(a) and 4(a) can be combined in order to provide a configuration which provides a total number ($FH_{seq\_total}$) of 4×6=24 sequences each having a length ($FH_{seq\_length}$) of 8 numbers chosen among 8 unique frequency hop numbers ($FH_{hop\_unique}$). This is shown in FIG. 5 in which a PERM module 500 is connected in series with an XOR module 502. The MSB of the output of the PERM module 500 is not fed to the XOR module, since, as discussed above in connection with FIG. 3(b), this bit does not contribute to the generation of additional unique sequences.

Since the PERM and XOR operations are directly performed on the clock lines, it makes no difference whether the XOR operation is performed before or after the PERM operation. Also, although only three clock lines are shown in FIG. 5, it will be understood that the configuration shown there can be extended for a larger number of clock lines. In general, for N clock lines, the sequence length $FH_{seq\_length}$ and the number of unique hop numbers $FH_{hop\_unique}$ is $2^N$, and the number of different FH sequences $FH_{seq\_total}$ generated is $N! \times 2^{(N-1)}$.

Figure 6:
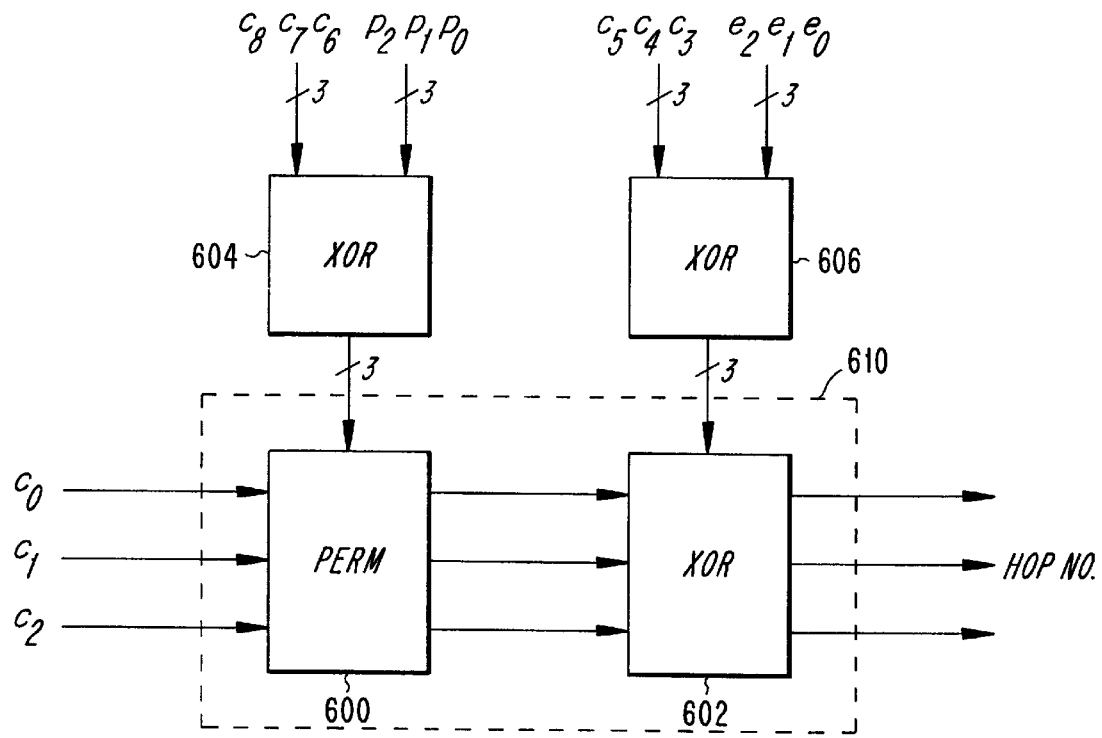
FIG. 6 is a variation of the embodiment shown in FIG. 5, in which the input addresses are processed using XOR modules.

Longer sequences can be obtained using the frequency hopping generator shown in FIG. 6. In this embodiment, the basic configuration of FIG. 5 is employed in which a PERM module 600 is combined with an XOR module 602. This block of processing modules is enclosed in dotted lines and is referred to as a "clock LSB processing module" 610 hereinafter. This module also forms the core of the circuits shown in FIGS. 7 and 8. Hereinafter, the symbol "N" represents the number of clock lines fed to the clock LSB processing module.

Additionally, in FIG. 6, an extra bit-by-bit XOR operation is now applied between the MSBs ($c_8c_7c_6$ and $c_5c_4c_3$) of the clock and the selection bits using XOR modules 604 and 606. The output of the XOR module 604 is a three-bit signal which is applied to the input of the PERM module 600, and the output of the XOR module 606 is a 3-bit signal which is applied to the input of the XOR module XOR module 602. The XOR operations performed by modules 604 and 606 are defined by the table shown in FIG. 3(b).

Note that the MSB of $c_2$ can now be XORed since the total (cascaded) sequence does not have the property that by rotating the sequence by N/2 the same sequence results. Thus, the total number of sequences $FH_{seq\_total}$ produced by the XOR module itself is now $2^N$.

In the example of FIG. 6, the clock LSB processing module produces a series of 64 "subsequences" of hop numbers (hereinafter referred to as "segments") each of length 8. These segments are cascaded. Each segment is different due to the changes in the outputs of the XOR processing modules 604 and 606 for each segment. The total length of each sequence $FH_{seq\_length}$ produced by cascading the segments is 8×64=512. The length of the sequence in this embodiment is equal to $2^K$, where K is the number of clock lines fed to the entire circuit (e.g., including the clock lines fed to the clock LSB processing module and the clock lines used as selection inputs). In the specific case of FIG. 6, K=9 clock lines are used. The number of different sequences $FH_{seq\_total}$ is $3! \times 2^3$=48. In this embodiment, there are still $2^N$=8 unique hop frequencies ($FH_{hop\_unique}$), but the longer sequence visits each frequency more often. All hop frequencies are visited with the same probability.

Figure 7:
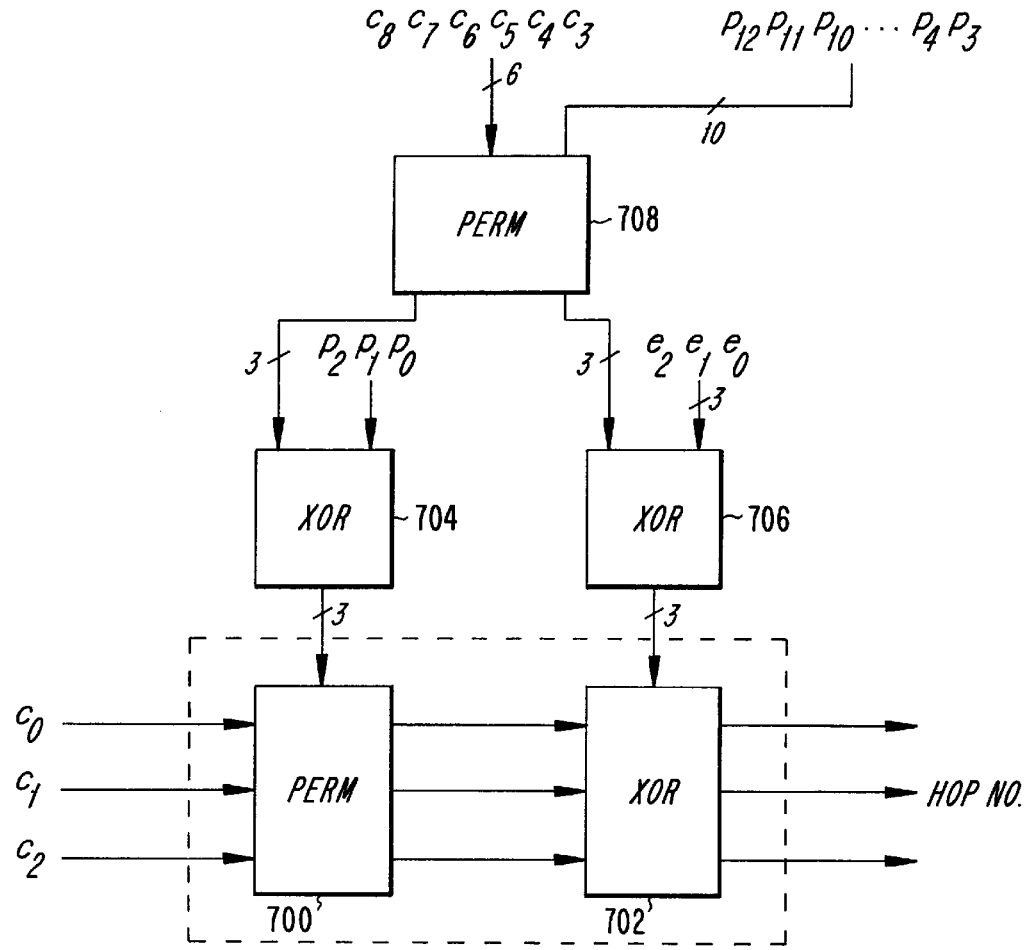
FIG. 7 is a variation of the embodiment shown in FIG. 5, in which the input addresses are processed using XOR modules and a PERM processing module.

The number of sequences $FH_{seq\_total}$ can be increased by additionally applying a PERM operation in the selection lines. This is shown in FIG. 7, which differs from the FIG. 6 embodiment by adding a second PERM module 708. The second PERM module 708 performs a permutation operation on the MSB clock lines $c_8c_7c_6c_5c_4c_3$ as a function of the permutation address $p_{12}p_{11}p_{10} \cdots p_5p_4p_3$. More specifically, the permutation operation effectively switches the input clock lines as a function of the input permutation address in a manner similar to that illustrated in FIGS. 4(a)–4(d), but on a larger scale. The selection input ($p_{12}p_{11}p_{10} \cdots p_5p_4p_3$) has more input lines than the clock signal ($c_8c_7c_6c_5c_4c_3$) to account for all of the permutations possible in the input clock signal.

The output of the second PERM module comprises two 3-bit signals. The 3-bit signals are fed to XOR modules 704 and 706. The XOR modules 704 and 702 perform an XOR operation between the output of the PERM module 708 and the selection inputs $p_2p_1p_0$ and $e_2e_1e_0$, respectively, in a manner similar to that illustrated in FIGS. 3(a) and 3(b). The outputs of the XOR modules 704 and 702 comprise two 3-bit signals, which are fed to the PERM module 700 and the XOR module 702, respectively.

In FIG. 7, the sequence length $FH_{seq\_length}$ is still 512, but the number of different sequences $FH_{seq\_total}$ has increased by a factor of 6! to a total of $6! \times 3! \times 2^3$=34560 sequences. The number of unique frequency hop numbers $FH_{hop\_unique}$ is still 8.

Although FIGS. 5–7 show three examples of different arrangements of PERM and XOR modules, those skilled in the art will appreciate that different lengths and numbers of sequences can be achieved by providing different arrangements of modules. For instance XOR and PERM operations can also be performed on selection inputs $p_{12}p_{11}p_{10} \cdots p_4p_3$ using still higher MSBs of the clock.

The clock LSBs can also be used for operations with the selection lines p and e. However, in this case, the hop frequencies in each segment are not unique anymore. In addition, it cannot be guaranteed that each hop is visited with equal probability when considering the entire sequence.

In the embodiments discussed above, the total number of unique hop numbers $FH_{hop\_unique}$ was limited to $2^N$, where N is the number of input clock lines fed to the clock LSB processing module. This restricts the total number of unique hop frequencies to a limited set of numbers (e.g., 2, 4, 8, 16, 32, etc.). This restriction on the total number can be avoided by expanding the total number of output hop numbers using a modulo M adder, and by decreasing the total number of hop numbers using a modulo M counter. For instance, 10 unique hop numbers can be provided by using N=3 clock input lines to provide 8 different hop numbers and then using an adder to provide at least two additional hop numbers.

Figure 8:
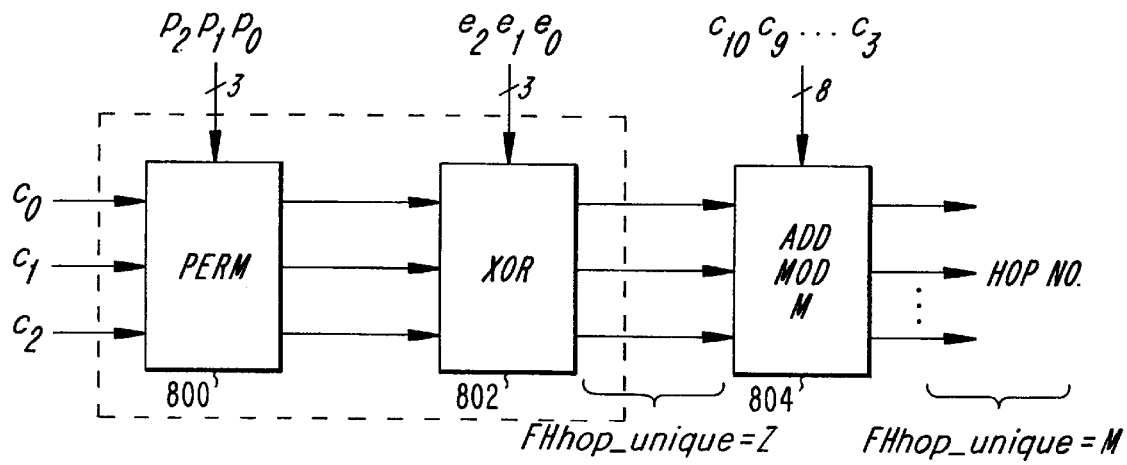
FIG. 8 is a variation of the embodiment shown in FIG. 5, in which the output of the XOR module is further processed using a modulo M adder.

For instance, FIG. 8 shows a variation of the FIG. 5 embodiment employing a PERM module 800 connected in series with an XOR module 802. The PERM module 800 and the XOR module 802 receive selection inputs $p_2p_1p_0$ and $e_2e_1e_0$, respectively, as in the case of FIG. 5. The output of the XOR module 802 is fed to a first input of an adder 804. A second input of the adder 804 receives a clock signal $c_{10}c_9c_8 \ldots c_4c_3$. In In the above configuration, the output of the XOR module 802 defines a total number of unique hop numbers $FH_{hop\_unique}=Z(=2^N)$, where Z<M. A segment of length z in the list of M available hop numbers is encompassed by a specific selection of clock MSBs. When the MSBs change, a different segment of length Z is encompassed. Preferably, M is a prime number. Then, after M incremental shifts, the original portion of Z hop numbers is revisited.

Again, the clock bits supplied to the adder can be treated with XOR and PERM operations in order to randomize the selection of the Z-length segment in the M-length hop frequency list in the manner discussed above with respect to FIGS. 6 and 7.

Furthermore, the adding operation can be applied to the clock LSBs in FIGS. 6 and 7. Adding a fixed offset gives an offset in phase. For the basic configuration shown in FIG. 5, this will not give a different sequence because it only results in a rotated version of the same sequence. However, when considering cascaded segments, rotating the segments by adding a phase offset will indeed give a different FH sequence.

In FIG. 8, the number of hop numbers M is greater than Z. A clock counter modulo M can be used in place of the adder 804 to provide M hop numbers such that M<Z.

Until now, the hop number derived from the embodiments shown in FIGS. 5–8 was assumed to directly represent the hop frequency. However, in some cases, it is advantageous to map the hop number on the hop frequencies in an indirect manner. For example, in certain applications, it is advantageous to cover as large a part in the spectrum as possible in only a single segment. Consecutive hop numbers should correspond to hop frequencies spaced sufficiently far apart. This, for example, prevents consecutive hops from corresponding to adjacent hop frequencies. Spacing consecutive hop frequencies far apart is especially beneficial when interleaving is applied to counteract burst errors.

Figure 9:
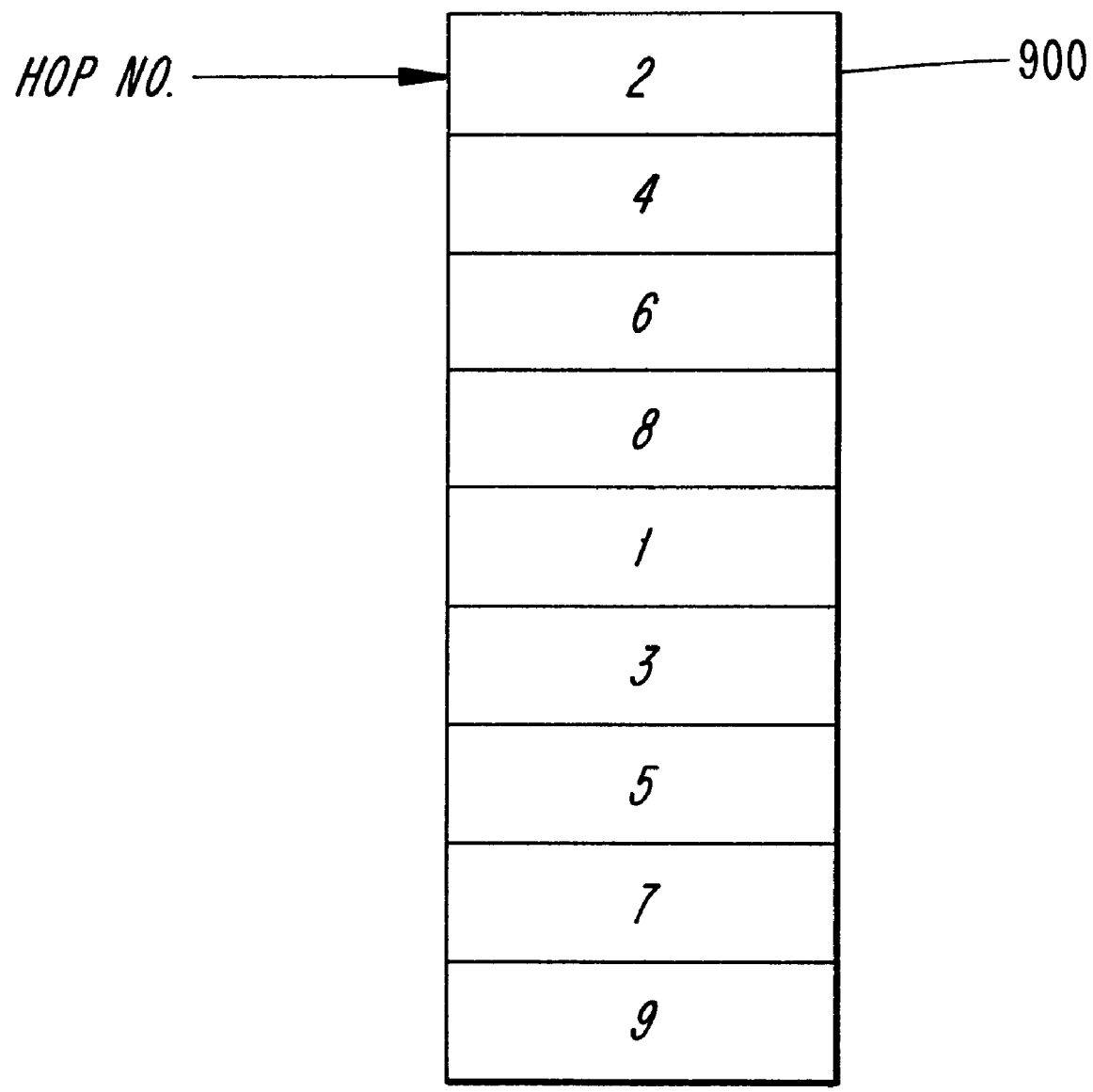
FIG. 9 shows the contents of a memory used to select a hopping frequency on the basis of an input hop number.

Output hop numbers and hopping frequencies can be mapped using a RAM or ROM, as shown in FIG. 9. As shown there, the hop number is used to address memory 900, such as a RAM or ROM. The memory 900 includes an indication of the hop frequencies. The contents of this memory can be initialized once during manufacturing or during installation, and therefore, in one embodiment, the contents are fixed during use.

The contents in the memory are such that a segment of the contents having a length $2^N$ (segment length) contains frequencies spaced sufficiently apart. For example, the contents of the memory is indicated for M=9 (e.g., 9 hop numbers and frequencies) and N=2 (e.g., 2 LSB clock lines fed to the clock LSB processing module). A sequence has a length 4 (e.g., 22). In total, there are 9 segments each with 4 consecutive memory locations. Each segment "spans" the spectrum ranging from frequency 1 to 9, but adjacent hops will always be at least 2 hops apart.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A frequency hopping generator for use in a wireless communication network, comprising:

at least one permutation (PERM) processing module for processing a first portion of a clock signal as a function of at least one PERM address signal, wherein the PERM module performs a permutation of the first portion of the clock signal; and at least one exclusive OR (XOR) processing module, arranged in series with said at least one PERM module, for processing a second portion of said clock signal as a function of at least one XOR address signal;

wherein an output of said serially arranged at least one PERM and XOR modules defines one of a plurality of hop numbers;

wherein changes in said address signals produce a substantially instantaneous change in an output sequence of said hop numbers; and wherein changes in either of said first and second portions of said clock signal produce a substantially instantaneous change in a phase of an output sequence of said hop numbers.

2. A frequency hopping generator for use in a wireless communication network, comprising:

a first permutation (PERM1) processing module having a first PERM1 input for receiving a first portion of a clock signal and a second PERM1 input for receiving a PERM1 selection address, and having a PERM1 output, wherein the PERM1 processing module performs a permutation of the first portion of the clock signal; and a first exclusive OR (XOR1) processing module having a first XOR1 input for receiving said PERM1 output and having a second XOR1 input for receiving an XOR1 selection address, and having an XOR1 output defining one of a plurality of Z hop numbers.

3. A frequency hopping generator for use in a wireless communication network, comprising:

a first permutation (PERM1) processing module having a first PERM1 input for receiving a first portion of a clock signal and a second PERM1 input for receiving a PERM1 selection address, and having a PERM1 output; and a first exclusive OR (XOR1) processing module having a first XOR1 input for receiving said PERM1 output and having a second XOR1 input for receiving an XOR1 selection address, and having an XOR1 output defining one of a plurality of Z hop numbers, wherein said first PERM1 processing module selectively switches bit positions in said first portion of said clock signal on the basis of said PERM1 selection address.

4. The frequency hopping generator of claim 2, wherein said first XOR1 processing module performs a bit-wise exclusive OR logic function on the PERM1 output on the basis of said XOR1 selection address.

5. A frequency hopping generator for use in a wireless communication network, comprising:

a first permutation (PERM1) processing module having a first PERM1 input for receiving a first portion of a clock signal and a second PERM1 input for receiving a PERM1 selection address, and having a PERM1 output; and a first exclusive OR (XOR1) processing module having a first XOR1 input for receiving said PERM1 output and having a second XOR1 input for receiving an XOR1 selection address, and having an XOR1 output defining one of a plurality of Z hop numbers, and further comprising:

a second XOR (XOR2) processing module having a first XOR2 input for receiving a second portion of said clock signal and a second XOR2 input for receiving an XOR2 selection address, and having an output defining said PERM1 selection address; and a third XOR (XOR3) processing module having a first XOR3 input for receiving a third portion of said clock signal and a second XOR3 input for receiving an XOR3 selection address, and having an output defining said XOR2 selection address.

6. The frequency hopping generator of claim 5, further comprising:

a second PERM (PERM2) processing module having a first PERM2 input for receiving a fourth portion of said clock signal and a second PERM2 input for receiving a PERM2 selection address, and having a first PERM2 output defining said first XOR2 input of said second XOR2 processing module and having a second PERM2 output defining said first XOR3 input of said third XOR3 processing module.

7. The frequency hopping generator of claim 5, wherein said first portion of said clock signal comprises least significant bits of said clock signal and said second and third portions of said clock signal comprise higher order bits of said clock signal.

8. A frequency hopping generator for use in a wireless communication network, comprising:

a first permutation (PERM1) processing module having a first PERM1 input for receiving a first portion of a clock signal and a second PERM1 input for receiving a PERM1 selection address, and having a PERM1 output; and a first exclusive OR (XOR1) processing module having a first XOR1 input for receiving said PERM1 output and having a second XOR1 input for receiving an XOR1 selection address, and having an XOR1 output defining one of a plurality of Z hop numbers, and further comprising:

a modulo M adder having a first adder input for receiving said XOR1 output defining said one of said Z hop numbers, and having a second input for receiving a second portion of said clock signal, and having an adder output for outputing one of M hop numbers.

9. A frequency hopping generator for use in a wireless communication network, comprising:

a first permutation (PERM1) processing module having a first PERM1 input for receiving a first portion of a clock signal and a second PERM1 input for receiving a PERM1 selection address, and having a PERM1 output; and a first exclusive OR (XOR1) processing module having a first XOR1 input for receiving said PERM1 output and having a second XOR1 input for receiving an XOR1 selection address, and having an XOR1 output defining one of a plurality of Z hop numbers, and further comprising:

a memory for storing a plurality of hop frequencies corresponding to said Z output hop numbers, wherein one of said hop frequencies is selected on the basis of an input hop number generated by said first XOR1 module.

10. The frequency hopping generator of claim 9, wherein said frequencies are arranged such that consecutive hop numbers in a hop sequence are mapped into non-consecutive hop frequencies in said memory.

11. A frequency hopping generator for use in a wireless communication network, comprising:

a first exclusive OR (XOR1) processing module having a first XOR1 input for receiving a first portion of a clock signal and having a second XOR1 input for receiving an XOR1 selection address, and having an XOR1 output; and a first permutation (PERM1) processing module having a first PERM1 input for receiving said XOR1 output and a second PERM1 input for receiving a PERM1 selection address, and having a PERM1 output defining one of a plurality of Z hop numbers, wherein the PERM1 processing module performs a permutation of the XOR1 output.

12. The frequency hopping generator of claim 11, wherein said first XOR1 processing module performs a bit-wise exclusive OR logic function on the first portion of the clock signal on the basis of said XOR1 selection address.

13. A frequency hopping generator for use in a wireless communication network, comprising:

a first exclusive OR (XOR1) processing module having a first XOR1 input for receiving a first portion of a clock signal and having a second XOR1 input for receiving an XOR1 selection address, and having an XOR1 output; and a first permutation (PERM1) processing module having a first PERM1 input for receiving said XOR1 output and a second PERM1 input for receiving a PERM1 selection address, and having a PERM1 output defining one of a plurality of Z hop numbers, wherein said first PERM1 processing module selectively switches bit positions in said XOR1 output on the basis of said PERM1 selection address.

14. A frequency hopping generator for use in a wireless communication network, comprising:

a first exclusive OR (XOR1) processing module having a first XOR1 input for receiving a first portion of a clock signal and having a second XOR1 input for receiving an XOR1 selection address, and having an XOR1 output; and a first permutation (PERM1) processing module having a first PERM1 input for receiving said XOR1 output and a second PERM1 input for receiving a PERM1 selection address, and having a PERM1 output defining one of a plurality of Z hop numbers, further comprising:

a second XOR (XOR2) processing module having a first XOR2 input for receiving a second portion of said clock signal and a second XOR2 input for receiving an XOR2 selection address, and having an output defining said XOR1 selection address; and a third XOR (XOR3) processing module having a first XOR3 input for receiving a third portion of said clock signal and a second XOR3 input for receiving an XOR3 selection address, and having an output defining said PERM1 selection address.

15. The frequency hopping generator of claim 14, further comprising:

a second PERM (PERM2) processing module having a first PERM2 input for receiving a fourth portion of said clock signal and a second PERM2 input for receiving a PERM2 selection address, and having a first PERM2 output defining said first XOR2 input of said second XOR2 processing module and having a second PERM2 output defining said first XOR3 input of said third XOR3 processing module.

16. The frequency hopping generator of claim 14, wherein said first portion of said clock signal comprises least significant bits of said clock signal and said second and third portions of said clock signal comprise higher order bits of said clock signal.

17. A frequency hopping generator for use in a wireless communication network, comprising:

a first exclusive OR (XOR1) processing module having a first XOR1 input for receiving a first portion of a clock signal and having a second XOR1 input for receiving an XOR1 selection address, and having an XOR1 output; and a first permutation (PERM1) processing module having a first PERM1 input for receiving said XOR1 output and a second PERM1 input for receiving a PERM1 selection address, and having a PERM1 output defining one of a plurality of Z hop numbers, and further comprising:

a modulo M adder having a first adder input for receiving said XOR1 output defining said one of said Z hop numbers, and having a second input for receiving a second portion of said clock signal, and having an adder output for outputing one of M hop numbers.

18. A frequency hopping generator for use in a wireless communication network, comprising:

a first exclusive OR (XOR1) processing module having a first XOR1 input for receiving a first portion of a clock signal and having a second XOR1 input for receiving an XOR1 selection address, and having an XOR1 output; and a first permutation (PERM1) processing module having a first PERM1 input for receiving said XOR1 output and a second PERM1 input for receiving a PERM1 selection address, and having a PERM1 output defining one of a plurality of Z hop numbers, and further comprising:

a memory for storing a plurality of hop frequencies corresponding to said Z output hop numbers, wherein one of said hop frequencies is selected on the basis of an input hop number generated by said first PERM1 module.

19. The frequency hopping generator of claim 18, wherein said frequencies are arranged such that consecutive hop numbers in a hop sequence are mapped into non-consecutive hop frequencies in said memory.

20. A method for use in a frequency hopping wireless network, comprising the steps of:

receiving a clock signal comprising rows and columns of clock information bits;

performing permutation processing on a first portion of said clock signal to vary bit values in a column direction of said information bits as a function of a first permutation address;

performing exclusive OR processing on a second portion of said clock signal to vary bit values in a row direction of said information bits as a function of a first exclusive OR address; and generating one of Z output frequency hop numbers on the basis of said permutation processing and said exclusive OR processing.

21. The method of claim 20, wherein said permutation processing precedes said exclusive OR processing.

22. The method of claim 20, wherein said exclusive OR processing precedes said permutation processing.

23. The method of claim 20, further including the steps of:

performing exclusive OR processing on a third portion of said clock signal and a second permutation address to generate said first permutation address; and performing exclusive OR processing on a fourth portion of said clock signal and a second exclusive OR address to generate said first exclusive OR address.

24. The method of claim 23, further including the step of:

performing permutation processing on a fifth portion of said clock signal to generate said second and third portions of said clock signal.

25. The method of claim 20, further including the step of:

processing said one of Z frequency hop numbers using a modulo M adder to generate one of M frequency hop numbers.

26. The method of claim 20, further including the step of:

accessing a memory on the basis of said one of said Z output frequency hop numbers to retrieve one of a plurality of output hop frequencies, wherein said memory is so organized such that consecutive hop numbers correspond to non-consecutive hop frequencies.

27. A frequency hopping generator for use in a wireless communication network, comprising:

a permutation processing module having a first input for receiving a first portion of a clock signal and a second input for receiving a selection address, and having an output defining one of a plurality of hop numbers, wherein the permutation processing module performs a permutation of the first portion of the clock signal.

28. A frequency hopping generator for use in a wireless communication network, comprising:

an XOR processing module having a first input for receiving a first portion of a clock signal and a second input for receiving a selection address, and having an output defining one of a plurality of hop numbers.

29. A method for use in a frequency hopping wireless network, comprising the steps of:

receiving a first portion of a clock signal comprising rows and columns of clock information bits;

performing permutation processing on said first portion of said clock signal to vary bit values in a column direction of said information bits as a function of an address signal; and generating one of Z output frequency hop numbers on the basis of said permutation processing.

30. A method for use in a frequency hopping wireless network, comprising the steps of:

receiving a first portion of a clock signal comprising rows and columns of clock information bits;

performing exclusive OR processing on said first portion of said clock signal to vary bit values in a row direction of said information bits as a function of an address signal; and generating one of Z output frequency hop numbers on the basis of said XOR processing.

* * * * *